United States Patent [19]
Fearns et al.

[11] 3,859,102
[45] Jan. 7, 1975

[54] FRIT COMPOSITIONS AND GLAZE AND FLUX COMPOSITIONS OBTAINED THEREFROM

[75] Inventors: Robert Henry Fearns; Wallace George Sanderson, both of London, England

[73] Assignee: Matthey Johnson & Co. Limited, London, England

[22] Filed: June 6, 1973

[21] Appl. No.: 367,406

Related U.S. Application Data

[63] Continuation-in-part of Ser. No. 233,362, March 9, 1972, abandoned.

[30] Foreign Application Priority Data
Mar. 19, 1971   Great Britain ..................... 7326/71

[52] U.S. Cl. ................................... 106/49, 105/53
[51] Int. Cl. ......... C03c 3/10, C03c 5/00, C03c 3/04
[58] Field of Search .............................. 106/49, 53

[56] References Cited
UNITED STATES PATENTS
3,503,763   3/1970   Mills ................................... 106/53

Primary Examiner—Winston A. Douglas
Assistant Examiner—Mark Bell
Attorney, Agent, or Firm—Cushman, Darby & Cushman

[57] ABSTRACT

This specification describes frit compositions and glaze and flux compositions which are produced by comminuting and firing such compositions. The flux and glaze compositions described produce on firing on to a piece of ware a "metal release free" or "metal release resistant" glaze. The frit composition has a constitution comprising 10–25 wt. percent lead oxide, 50–60 wt. percent silicon oxide, 12.5–25 wt. percent boron oxide, 1–2.5 wt. percent lithium oxide, 5–12.5 wt. percent aluminium oxide, 1.7–5 wt. percent sodium oxide and 1–7.5 wt. percent zirconium oxide.

4 Claims, No Drawings

FRIT COMPOSITIONS AND GLAZE AND FLUX COMPOSITIONS OBTAINED THEREFROM

This application is a continuation-in-part of Ser. No. 233,362, filed Mar. 9, 1972, now abandoned.

This invention relates to frit compositions and to glaze and flux compositions which are produced by comminuting and firing such compositions. The invention also relates to glazes produced by firing such glaze and flux compositions. In particular, the invention is concerned with glaze and flux compositions which are especially suitable for firing on to ceramic articles and particularly on to such articles which are coloured or decorated with one or more inorganic pigments.

A glaze is traditionally applied to ceramic ware to enhance its appearance; to seal the surfaces of the ware and thereby to render it impermeable to water and other liquids and to make it easier to clean; and, in the case of coloured or decorated ware, to protect the colours or decorations from abrasion damage and from attack by acids and alkalis and certain other liquids.

Methods for the "underglaze" decorations of ceramic ware in which a glaze is applied and fired on the previously decorated but unglazed ware have long been practised. Further, so-called underglaze transfers or 'decals' are often used to decorate the ware prior to the application of the glaze. A disadvantage of this process is that the leadless glazes commonly used for it need to be fired at a relatively high temperature and this limits the 'palette' or range of colours which may be employed for the decoration since several pigments will not withstand the high firing temperature.

This disadvantage led to the development of "overglaze" or "on-glaze" decoration in which a decorative design in vitrifiable ceramic colours or pigments is applied to and fired on the outer surface of previously glazed ware. Such a design is often applied by means of a so-called overglaze or on-glaze transfer and the actual colours in the design generally contain powdered glass which will fuse at a lower temperature then the original glaze to which the design is applied. As a result, the colours are bounded together by means of and partly covered by low melting glass or flux after firing. Although a design fired on glazed ware in this way will withstand a reasonable degree of wear and tear it will not stand up very successfully to repeated cleaning in strong detergents to which it is subjected in washing-up machines or to mechanical abrasion in use.

In an attempt to overcome this disadvantage, some manufacturers have applied and fired a coating of low melting point glaze or a low melting point glaze formed by firing a frit composition and comminuting the resulting glass to form a glaze or flux over the design on previously glazed ware. The frit or glaze material used in this way may be applied over the design after it has been formed on the ware or it may form one of the layers of a decalcomania so that both the design and the glaze or flux material may be applied simultaneously to the ware.

In this specification, the term frit refers to that granulated or particulate material obtained when molten glass is poured into cold water. The terms glaze or glaze composition, according to their context, refer to a frit which has been comminuted and which may or may not contain additional constituents. The term glaze is also used to include the glass-like layer obtained when a glaze composition has been fired on to ware. The term flux is also used to describe the material which has been referred to above as a glaze or glaze composition.

By "low-melting point glaze" or "flux" is meant a glaze or frit having a melting point lower than that of the glaze to which the design itself is applied and, by the use of such material, it has been possible to protect designs very effectively against mechanical abrasion and attack by chemicals. Unfortunately, the low-melting point glazes hitherto employed often contain a good deal of lead as part of their basic composition. Further, they may have extra heavy metals such as lead added to them in the form of the oxide or other compounds since it is generally desirable to add to the glaze composition, before firing, one or more metal oxides which will be present in the ceramic colours used in the design but which are either absent, or present in very small quantities, in the glaze composition itself. This prevents such an oxide or such oxides from being "leached" out of the pigment by the glass during firing and thereby prevents the pigment from being damaged or destroyed.

It has recently become apparent that flux or glaze, in addition to preserving the decorative character of a design by protecting it from mechanical and chemical attack should also be such that after it has been fired on to decorated ceramic ware, for example, it will not exhibit the phenomenon of "metal release" or will exhibit this phenomenon only to a limited extent. By metal release here and throughout the remainder of this specification is meant the transfer of certain metals, such as lead or cadmium, zinc, antimony and the like, either in the elementary or in the combined state from the design via the glaze or from the glaze itself or from both to a beverage or to a foodstuff or to some other material which is used in the preparation, preservation or treatment of beverages or foodstuffs when it is in contact with the glaze. The glaze or flux which does not exhibit this phenomenon of metal release or exhibits it only to a limited extent is described herein as either a "metal release free" glaze or flux as a "metal release resistant" glaze or flux respectively.

U.S. Pat. No. 3,503,763 describes a devitrifying glass composition for use as 'solder glass,' that is a material which can be used to join metals, semi-crystalline glasses or ceramic bodies in a manner generally similar to the soldering of metals. The glass composition of U.S. Pat. No. 3,503,763 is stated to be useful as a low expansion coating or glaze and consists essentially of

| | |
|---|---|
| PbO | 13–23% |
| $B_2O_3$ | 4–11% |
| $Li_2O$ | 4–6% |
| $Al_2O_3$ | 14–19% |
| $SiO_2$ | 39–50%, | and at least one member of the following class, namely,

| | |
|---|---|
| $TiO_2$ | 1–6% |
| $ZrO_2$ | 1–3%, and |

2–5 percent of iron oxide if $B_2O_3$ is present in an amount of between 4–6 percent.

In addition to the components mentioned above which preferably constitute 95 percent of the entire formulation, the glaze composition may also include lesser amounts of CaO, MgO, BaO, ZnO, $Na_2O$, $K_2O$, $As_2O_3$, FeO, $Fe_2O_3$ and other common glass making ingredients. As far as the said lesser amounts of sodium oxide and potassium oxide are concerned it is stated in U.S. Pat. No. 3,503,763 that these are normally present as trace components or impurities totalling not more than 1% since they inhibit devilification if present in higher concentrations. In the specific examples given in the said patent specification the quantity of sodium oxide used varies from 0.1 to 0.4 percent.

From the foregoing summary of U.S. Pat. No. 3,503,763, it will be seen that the patentee thereof deliberately directed his attention to producing a glaze composition which is crystallizable and which has a relatively low coefficient of expansion. It is, on the other hand, the object of the present invention to provide a flux and glaze composition and especially such latter compositions for use in connection with the over-glaze or on-glaze decoration of ware, which on firing will yield a metal release-free or metal release-resistant glaze. It is another object of the present invention to produce a transfer or decalcomania for applying a design to a substrate which includes at least one layer formed from a glaze composition according to the invention.

According to the invention a frit composition which, on comminution, application and firing will yield a release-free or release-resistant glaze, as herein defined, comprises 10–25 wt percent lead oxide, 12.5–25 wt percent boron oxide, 50–60 wt percent silicon oxide, 1–2.5 wt percent lithium oxide, 5–12.5 wt percent aluminium oxide, 1.7–5 wt percent sodium oxide and 1–7.5 wt percent zirconium oxide.

The presence of between 1.7 and 5 wt percent sodium oxide in the frit composition of the present invention substantially prevents crystallisation of the glass when heated. More particularly in the case of over or on-glaze decoration of ware, the presence of sodium oxide increases the coefficient of expansion or the glass to make it more nearly compatible with the glazes or ware to which it is applied.

The present invention also includes a glaze or flux when formed by comminuting and firing a frit composition of the above-mentioned type; a glaze formed from such a frit and a glaze formed on a substrate by firing a frit of the type just described.

A suitable glaze or flux composition consists essentially of 10.5–20.0 wt percent lead oxide, 50–53 wt percent silicon oxide, 15–21 wt percent boron oxide, 1.5–4.0 wt percent sodium oxide, 1.5–2.5 wt percent lithium oxide, 3.5–4.5 wt percent zirconium oxide, and 7–10 wt percent aluminum oxide.

We have found that within the composition ranges of the present invention specified above, there is at least one frit composition which produces an extraordinarily effective metal release-resistant glaze or flux. As an example of such a composition (herein referred to as Composition I) is that containing

| 16.6 | wt% of | PbO |
| 15.7 | do. | $B_2O_3$ |
| 51.1 | do. | $SiO_2$ |
| 1.7 | do. | $LiO_2$ |
| 8.4 | do. | $Al_2O_3$ |
| 2.8 | do. | $Na_2O$ |
| 3.7 | do. | $ZrO_2$ |

A glaze or flux may be formed from the above composition by:

1. melting the thoroughly mixed components and maintaining the melt at 1200° C until it is clear;
2. pouring the melt into water;
3. grinding the resultant glass particles in a ball mill to a surface area of 6,000 – 12,000 sq. cm. per gram, drying the product and passing it through a sieve of 150 B.S. mesh.

In order to test the effectiveness of the metal release-resistant glaze or flux formed from a frit prepared in accordance with the foregoing description, samples of a glaze or flux were applied to and then fired on a series of 10 inch glazed ceramic plates. Each of these plates bore a decoration on the outer surface of the glazed substrate and the glaze/flux was applied so that it covered the whole of the design. At the same time as each plate was fired, a control plate bearing the same design but in this case coated with a glaze/flux formed from a known frit material having a composition detailed below was also fired under the same conditions. The composition of the known glaze material was:

|  | Wt% |
|---|---|
| PbO | 63.0 |
| $B_2O_3$ | 5.1 |
| $SiO_2$ | 21.0 |
| $Li_2O$ | 1.3 |
| $Al_2O_3$ | 3.4 |
| $TiO_2$ | 3.1 |
| CaO | 3.1 |
|  | 100.0 |

EXAMPLE

In the following example, the quantities of Pb and Cd are expressed in parts per million.

|  | Pb | Cd |
|---|---|---|
| A + known glaze | 28.35 | 0.16 |
| A + inventive glaze | 2.5 | None detected |
| B + known glaze | 103.27 | 0.45 |
| B + inventive glaze | 1.42 | 0.03 |
| C + known glaze | 1.69 | None detected |
| C + inventive glaze | 0.28 | None detected |
| D + known glaze | 27.5 | 4.51 |
| D + inventive glaze | 3.92 | 0.39 |

After firing, each plate was subjected to a test to evaluate the lead and cadmium metal release properties of the glaze and decoration. This was carried out by filling each plate to the rim with 4 percent acetic acid solution, allowing the plate to stand for 24 hours at room temperature and then determining the lead and cadmium metal content of the solution. The results expressed in parts per million of the acetic acid solution are given below.

Examples A and B contained in the design large areas of an over-glaze enamel coloured with cobalt blue pigments;

Example C contained in the design large areas of an over-glaze enamel coloured with iron oxide pigment, and Example D contained in the design large areas of an over-glaze enamel coloured with cadmium sulpho-selenide pigment.

As will be seen from the above figures the quantity of lead removed from the glaze and/or the design was quite dramatically reduced in each example, in one case by a factor of slightly more than 72.7 and in the others by factors ranging from slightly more than 6 to rather more than 11. Striking reductions were also obtained in the amount of cadmium removed in three of the examples.

These figures illustrate very clearly the effectiveness of a glaze according to the invention in substantially reducing the levels of lead and cadmium release.

Extensive comparative tests have been undertaken with the "glaze/flux" (Composition I)" and several well-known glazes/fluxes in order to determine any improvement in the glaze/flux according to the invention over such known glazes/fluxes not only as regards visual appearance after firing but also its metal release free or metal release resistant characteristics after testing in acid conditions. It is again emphasised that a low metal release value of a glaze or flux should not be obtained at the expense of colour changes in the design or loss of resistance to acids and alkalis.

Tests have been carried out on a decorative design in which orange, blue and red overglaze enamels were incorporated in comparison with the identical designs on which the preferred glaze/flux referred to in paragraph 3 of page 5 hereof fired on glazed feldspathic porcelain at 800° C, on a glazed bone china substrate fired at 780° C and on glazed earthenware fired at 720° C. Visual observations were made on the decorative design after firing, after alkali tests and after 4 percent acetic acid solution tests for lead and cadmium metal release.

The results obtained after comparing the superimposed protective glaze/flux described according to the invention with four other well-known glaze/flux compositions have shown that where in some cases a low lead and cadmium metal release value is obtained it is produced at the expense of colour changes and/or loss of resistance. The results obtained with the preferred glaze/flux produced according to this invention show than colour and surface gloss is quite unaffected whilst the lowmetal release value for lead and cadmium is obtained, such results being produced consistently through the range of the tests.

Further examples of frit and glaze compositions which illustrate percentage variations of the preferred frit constituents referred to above have been prepared and tested as to their physical properties and their effectiveness as superimposed glazes/fluxes on designs formed from three known overglaze enamels which exhibit relatively high metal release characteristics.

Table I below shows the percentage variations of four frit compositions designated 2, 3, 4 and 5 as compared with the preferred frit composition designated I.

Table 2 shows the results of the lead and cadmium metal release properties of these glazes-fluxes when superimposed on transfer or decal designs incorporating the aforementioned pigmented over-glaze enamels. The examination of these results showed that the glaze/flux composition which gave the best overall results in the preferred composition as described in the invention.

TABLE I

Percentage Formulae (Variations of Preferred Flux or Glaze)

| | Formulations | | | | |
|---|---|---|---|---|---|
| | Preferred Flux (1) | 2 | 3 | 4 | 5 |
| PbO | 16.60 | 20.00 | 10.95 | 15.50 | 6.50 |
| $SiO_2$ | 51.10 | 51.25 | 50.60 | 53.00 | 44.05 |
| $B_2O_3$ | 15.70 | 15.50 | 20.80 | 16.30 | 12.30 |
| $Na_2O$ | 2.80 | 1.65 | 3.80 | 1.50 | 6.75 |
| $Li_2O$ | 1.70 | 1.60 | 2.28 | 2.10 | 1.35 |
| BaO | — | — | — | — | 8.55 |
| $Al_2O_3$ | 8.40 | 10.00 | 7.35 | 7.60 | 10.10 |
| $ZrO_2$ | 3.70 | — | 4.22 | 4.00 | 4.40 |
| $F_2$ | — | — | — | — | 6.00 |

TABLE II

Pb/Cd release tests using preferred glaze and formulation variations as a superimposed flux, or glaze, or known high metal release enamels.

| | | Pb | Cd |
|---|---|---|---|
| Cadmium Red | + Preferred Glaze (1) | 0.49 | 0.04 |
| do. | + Formulation (2) | 3.60 | 0.03 |
| do. | + Formulation (3) | 0.91 | 0.12 |
| do. | + Formulation (4) | 0.43 | 0.04 |
| do. | + Formulation (5) | 4.84 | 0.13 |
| Chrome/Cobalt/Antimony Green | + Preferred Glaze (1) | 1.53 | 0.08 |
| do. | + Formulation (2) | 2.25 | 0.01 |
| do. | + Formulation (3) | 1.31 | 0.01 |
| do. | + Formulation (4) | 4.15 | 0.07 |
| do. | + Formulation (5) | 1.82 | — |
| Cobalt Silicate Blue | + Preferred Glaze (1) | 47.04 | 0.10 |
| do. | + Formulation (2) | 75.52 | 0.09 |
| do. | + Formulation (3) | 141.39 | 0.11 |
| do. | + Formulation (4) | 85.17 | 0.07 |
| do. | + Formulation (5) | 83.83 | 0.05 |

In addition to the frit composition already specified and the glaze/flux formed from it, the invention also includes ceramic and other articles when provided with a glaze/flux layer formed by firing on them such a glaze/flux composition obtained by comminuting the frit composition. The invention still further includes transfers or decalcomanias embodying at least one layer formed from the frit of glaze/flux composition already specified. Such transfers or decalcomanias are suitable for the simultaneous application to a glass substrate or a glazed ceramic substrate.

What we claim is:

1. A frit composition suitable for comminuting and firing to provide a metal release-free or metal release-resistant ceramic glaze, said frit composition consisting essentially of 10–25 wt percent lead oxide, 50–60 wt percent silicon oxide, 12.5–25 wt percent boron oxide, 1–2.5 wt percent lithium oxide, 5–12.5 wt percent aluminium oxide, 1.7–5 wt percent sodium oxide and 1–7.5 wt percent zirconium oxide.

2. A glaze or flux composition adapted, on firing, to produce a metal release-free or metal release-resistant glaze consisting essentially of 10 – 25 wt percent lead oxide, 50 – 60 wt percent silicon oxide, 12.5 – 25 wt percent boron oxide, 1 – 2.5 wt percent lithium oxide, 5 – 12.5 wt percent aluminium oxide, 1.7 – 5 wt percent sodium oxide and 1 – 7.5 wt percent zirconium oxide.

3. A composition according to claim 2 consisting essentially of 10.5 – 20.0 wt percent lead oxide, 50 – 53 wt percent silicon oxide, 15 – 21 wt percent boron oxide, 1.5 – 4.0 wt percent sodium oxide, 1.5 – 2.5 wt percent lithium oxide, 3.5 – 4.5 wt percent zirconium oxide, and 7 – 10 wt percent aluminium oxide.

4. A composition according to claim 2 consisting essentially of 16.6 wt percent of lead oxide; 15.7 wt percent of boron oxide; 51.1 wt percent of silicon oxide; 1.7 wt percent of lithium oxide; 8.4 wt percent of aluminium oxide; 2.8 wt percent of sodium oxide and 3.7 wt percent of zirconium oxide.

* * * * *

UNITED STATES PATENT OFFICE
CERTIFICATE OF CORRECTION

Patent No. 3,859,102          Dated January 7, 1975

Inventor(s) Robert Henry Fearns and Wallace George Sanderson

It is certified that error appears in the above-identified patent and that said Letters Patent are hereby corrected as shown below:

<u>In the heading of the patent</u>, item [73] the assignee should read --Johnson, Matthey & Co., Limited, London, England--

Signed and sealed this 29th day of April 1975.

(SEAL)
Attest:

RUTH C. MASON
Attesting Officer

C. MARSHALL DANN
Commissioner of Patents
and Trademarks